Jan. 19, 1965 W. E. KUHN 3,166,380
PROCESS FOR THE PRODUCTION OF SUBMICRON SILICON CARBIDE
Filed May 1, 1961
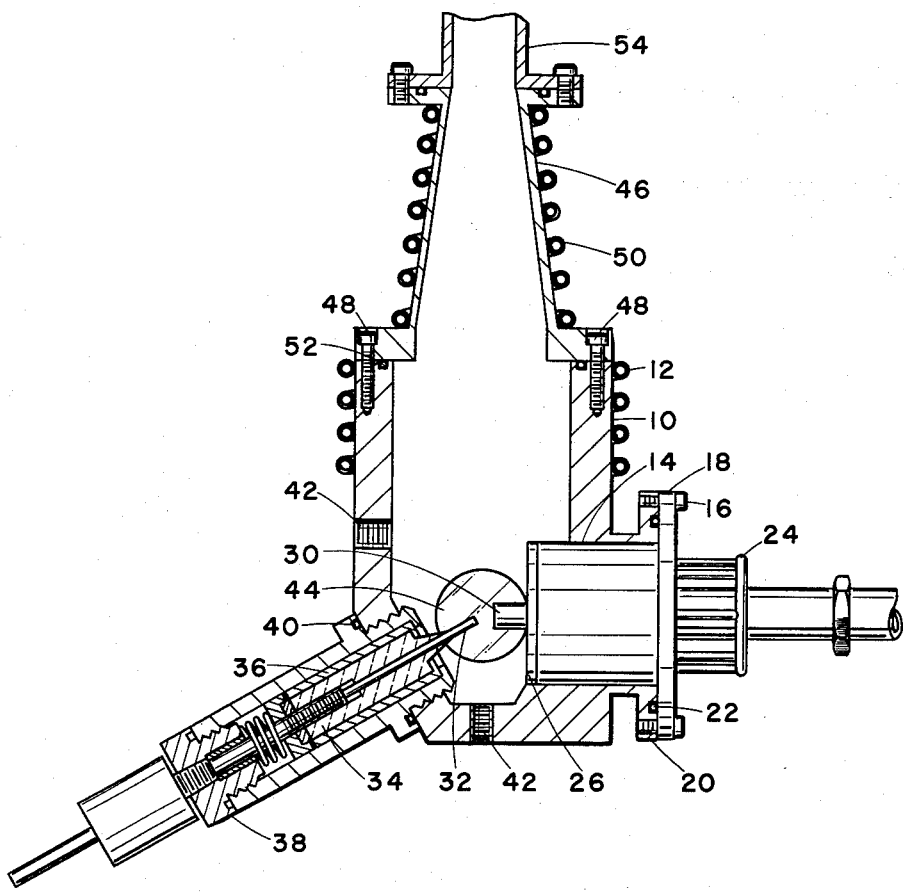
INVENTOR.
WILLIAM E. KUHN
BY
ATTORNEY

United States Patent Office 3,166,380
Patented Jan. 19, 1965

3,166,380
PROCESS FOR THE PRODUCTION OF SUBMICRON SILICON CARBIDE
William E. Kuhn, Niagara Falls, N.Y., assignor to The Carborundum Company, Niagara Falls, N.Y., a corporation of Delaware
Filed May 1, 1961, Ser. No. 106,596
4 Claims. (Cl. 23—208)

This invention relates to the manufacture of particulate silicon carbide having submicron particle sizes. More particularly, it relates to a direct process of making submicron silicon carbide utilizing a high-temperature arc and a consumable electrode.

Silicon carbide is a well-known and highly useful refractory material. It has been extensively used in both industrial and domestic applications. While its primary use has been in abrasive articles, it has been used for many other purposes, for example, in electrical resistance heating elements and in the fabrication of numerous articles which must withstand high temperatures. The properties of silicon carbide suggest many desirable applications for an extremely fine product if it could be made at a reasonable cost. For example, high density silicon carbide products could be made utilizing the submicron silicon carbide to fill the pores of the less dense products. Particulate silicon carbide lends itself to polishing applications because its fine size and platelike crystalline shape. The edges of the platelike crystals serve as extremely fine cutting edges which cleanly cut the material being polished while minimizing surface damage. Tests utilizing submicron silicon carbide in metal-lographic polishing of brass, steel, aluminum and other metals have shown stock removal rates up to five times as great as now obtained with alumina of comparable particle size while producing equivalent surface, finished as now obtained.

At present, silicon carbide is manufactured in Acheson-type electric resistance furnaces wherein an admixture of silica and coke is heated to a temperature of about 2,300° C. for about approximately 36 hours. The resultant product is a mass of extremely hard crystals. Even after expensive and time consuming crushing and grinding operations, the finished product has relatively large grain sizes; for example, grain sizes ranging from 30 grit to 1000 grit are quite common. It is totally unfeasible to produce silicon carbide having submicron particle sizes by this method. Some submicron silicon carbide has been produced for experimental purposes by comminution of the larger particles, but such material is not commercially available. The smallest silicon carbide grains commercially available are about 5 microns in size.

This invention provides a process whereby submicron silicon carbide may be produced directly from the raw materials in a manner which will make the product commercially attractive. Briefly stated, the process comprises forming a rod containing silica and carbon in approximately stoichiometric proportions as required for the manufacture of silicon carbide. A high-temperature arc is created and maintained between the rod and an electrode. As the rod is consumed by the arc, vapor species of silicon, carbon and oxygen are formed which react forming the particulate silicon carbide having submicron particle sizes.

The features and advantages of the invention will be more fully apparent from consideration of the following description thereof taken in conjunction with the appended drawing in which the figure is a section view of an arc furnace capable of performing this process.

Silicon carbide is prepared by reacting silica and carbon in accordance with the following formula:

$$SiO_2 + 3C \rightarrow SiC + 2CO$$

In the process of this invention, the raw materials are incorporated in an electrode to be consumed in an arc furnace. The electrode is prepared by dry mixing powdered silica and carbon. After the powders have been thoroughly mixed, a temporary binder is slowly added to the admixture while mixing continues. Then the admixture is extruded to form a rod having the desired length and diameter. The extruded rod is air-dried, oven dried and finally fired in a reducing atmosphere. The rod is now ready for use as a consumable electrode.

Referring now to the drawing, an arc furnace for use in this invention comprises a cylindrical, gas-tight arc chamber 10 of restricted volume which is surrounded by cooling coils 12. The chamber can be made of brass or any other suitable material. It should be able to withstand operations in a vacuum or at elevated pressures.

A consumable electrode 30, prepared as described above, extends into the interior of the arc chamber 10. The electrode is slidably mounted in a contact device 14 which is mounted in a port in the side of the arc chamber and is attached to the chamber by bolts 16 which extend through a flange 18 of the contact device and engage a flange 20 on the chamber adjacent the port. The contact device is connected to a source of electricity and supplies power to the consumable electrode.

A push rod (not shown), associated with the contact device, provides means for gradually inserting more of the electrode into the arc chamber whereby almost all of the electrode can be consumed and the electrode overhang maintained constant. The push rod may be manually or automatically operated. A face plate 26, made of a suitable refractory material such as boron nitride, covers the front of the contact device and protects the metal components of the contact device from the arc and prevents secondary arcing between the cathode and the housing of the contact device. An O-ring seal 22 keeps the arc chamber gas-tight and a water manifold 24 provides a means for cooling the contact device.

A graphite cathode 32 is held in a graphite bushing 34 which is in turn supported by an insulating bushing 36. This assembly is spring mounted in housing 38 which is mounted in a port in the arc chamber and is positioned so that the cathode tip is in the same vertical plane as the consumable electrode and inclined 45° below the horizontal plane of the anode. The cathode is connected to a source of electricity and is electrically insulated from the arc chamber by the insulating bushing 36. An O-ring seal 40 keeps the arc chamber gas tight.

Gas inlets 42 in the arc chamber provide an inlet for atmosphere gases, purge gases and carrier gases. A sight window 44 is provided in the chamber opposite the arcing area. Both the gas inlets and viewing windows are sealed with O-ring seals.

A cone shaped transition duct 46 is attached to the top of the arc chamber by bolts 48 and is water-cooled by coils 50 surrounding the duct. An O-ring seal 52 makes the junction gas-tight. The transition duct leads to an effluent tube 54 which, in turn, leads to any suitable collection means (not shown) such as an electrostatic dust collector or a cyclone collector.

In operation, in accordance with this invention, the arc chamber is purged and an inert or a reducing atmosphere admitted to the chamber. A direct current arc is developed between the anodic consumable electrode and the cathode by touching the electrode to the cathode tip after the power has been turned on. Upon ignition, the electrode is withdrawn and an arc gap maintained. The high temperature arc vaporizes the consumable electrode forming vapor species of silicon, carbon and oxygen in the reaction chamber. The vapors react forming submicron particles of silicon carbide. The arc length and the electrode overhang are maintained constant.

The minute particulate silicon carbide is carried by an inert or reducing gas which is admitted to the arc chamber through the gas inlets through the transition duct and effluent tube to a suitable collector such as an electrostatic precipitator. The product recovered is a powdery silicon carbide having predominantly submicron particle sizes.

The crude reaction product may be used directly in many applications; for example, as a polishing abrasive, insulation, pigment for paint or the like, filler, abrasive, flatting agent, catalyst carrier, filter media, chemical intermediate, and in metallurgy.

For some of the above enumerated applications, a more pure product may be desirable. Thus the crude products may be subjected to controlled oxidation to remove excess carbon or they may be leached with an acid to remove excess silica.

One feature of this invention is that the arc utilized in the process is not what has been termed by the art as a "high intensity" arc. The primary characteristic of the so-called "high intensity" arc is that there is a sudden transition point at which the rate of consumption of the consumable electrode increases markedly. In this process, no such phenomenon occurs. The electrode consumption rate gradually increases with increasing current. It reaches a peak at which increasing currents do not affect the consumption rate, or cause a slight decrease.

A distinguishing feature of this process is that the slag loss is practically zero; hence, nearly one hundred percent conversion of the electrode to product is obtained. In the manufacture of alumina fume using a high intensity arc a thirty percent slag loss may be encountered.

Example

The following specific example illustrates and highlights production of submicron silicon carbide according to this invention.

An admixture of 71% by weight silica and 29% by weight graphite was dry-mixed for about ten minutes in a Lancaster mixer. Thereafter, corn syrup binder was slowly added to the mixer and the mixing action continued for twenty more minutes. The total corn syrup added amounted to 43% by weight of the combined silica and graphite content of the mixture. The mix was extruded at 3000 pounds per square inch into rods ⅜ inch in diameter and two feet in length. The rods were air dried for an hour, oven-dried at 220° F. for 24 hours and finally fired at 800° C. for 16 hours in a reducing atmosphere provided by a graphite powder packing. Analysis of the fired rods showed a silica content of 65% by weight and a graphite content of 35% by weight. The increased graphite content results from carbon deposited from the corn syrup binder during firing.

The rods were inserted as anodes in an arc furnace similar to that described above and shown in the drawing. The arc chamber of the furnace was purged and an argon atmosphere admitted to the furnace and maintained at a pressure of one pound per square inch while allowing a flow of about two standard cubic feet per minute into the arc chamber through the duct to an electrostatic precipitator and into the atmosphere. The current was set at pre-determined values and an open circuit potential of 70 volts was applied to the electrodes. An arc was ignited by touching the rod or anode to the cathode tip. The anode was withdrawn and the arc gap maintained between ⅜ and ½ inch. The applied current, operating voltage, time of run, weight loss and consumption rate for various runs are shown in the following table:

| Current (amps) | Voltage (volts) | Time (Seconds) | Weight Loss (Grams) | Consumption (Grams/sec.) |
|---|---|---|---|---|
| 85 | 38 | 130 | 11.8 | 0.09 |
| 104 | 40 | 108 | 12.5 | 0.12 |
| 112 | 40 | 90 | 11.6 | 0.13 |
| 125 | 44 | 52 | 7.6 | 0.14 |
| 132 | 45 | 80 | 12.2 | 0.15 |
| 145 | 44 | 70 | 12.1 | 0.17 |
| 155 | 41 | 68 | 12.0 | 0.18 |
| 162 | 41 | 45 | 7.64 | 0.17 |
| 177 | 42 | 30 | 5.52 | 0.18 |

Argon gas and gases generated by the reactions carried the particulate material formed in the arc chamber through the effluent tube to an electrostatic precipitator wherein particulate silicon carbide was recovered. There appeared to be no splatter and no slag loss in the process.

While I have described the process of this invention in terms of the presently preferred operation thereof, it should be recognized that it may be otherwise embodied within the scope of the following claims.

I claim:

1. A method of making finely-divided silicon carbide of submicron particle size which comprises forming a rod containing silica and carbon in approximately stoichiometric proportions required by the equation:

$$SiO_2 + 3C \rightarrow SiC + 2CO$$

drawing a high-temperature, low-intensity arc between the rod and an electrode in an enclosure, vaporizing the rod by the thermal energy created by the arc, reacting the resulting vapors to form a particulate silicon carbide having submicron grain sizes and withdrawing the silicon carbide from the enclosure.

2. A method as set forth in claim 1 in which a non-oxidizing atmosphere is maintained in the enclosure.

3. A method as set forth in claim 1 in which a reducing atmosphere is maintained in the enclosure.

4. A method as set forth in claim 1 in which an inert gas atmosphere is maintained in the enclosure.

References Cited in the file of this patent

UNITED STATES PATENTS

| | | |
|---|---|---|
| 2,616,842 | Sheer et al. | Nov. 4, 1952 |
| 2,854,364 | Lely | Sept. 30, 1958 |
| 2,979,449 | Sheer et al. | Jan. 11, 1961 |